United States Patent
Dunjic et al.

(10) Patent No.: US 12,443,929 B2
(45) Date of Patent: Oct. 14, 2025

(54) CHECK-BASED INITIATION OF ELECTRONIC TRANSFERS

(71) Applicant: The Toronto-Dominion Bank, Toronto (CA)

(72) Inventors: Milos Dunjic, Oakville (CA); David Samuel Tax, Toronto (CA); Vipul Kishore Lalka, Oakville (CA)

(73) Assignee: THE TORONTO-DOMINION BANK, Toronto (CA)

( * ) Notice: Subject to any disclaimer, the term of this patent is extended or adjusted under 35 U.S.C. 154(b) by 0 days.

(21) Appl. No.: 17/482,581

(22) Filed: Sep. 23, 2021

(65) Prior Publication Data

US 2023/0086321 A1    Mar. 23, 2023

(51) Int. Cl.
*G06Q 20/04* (2012.01)
*G06Q 20/32* (2012.01)
*G06V 30/416* (2022.01)
*G06V 30/19* (2022.01)

(52) U.S. Cl.
CPC ....... *G06Q 20/0425* (2013.01); *G06Q 20/047* (2020.05); *G06Q 20/3255* (2013.01); *G06V 30/416* (2022.01); *G06V 30/19007* (2022.01)

(58) Field of Classification Search
CPC ............ G06Q 20/0425; G06Q 20/047; G06Q 20/3255; G06V 30/416; G06V 30/10
USPC .......................................................... 705/39
See application file for complete search history.

(56) References Cited

U.S. PATENT DOCUMENTS

| | | | | |
|---|---|---|---|---|
| 5,410,646 A * | 4/1995 | Tondevold | ............ | G06F 40/174 713/176 |
| 6,243,689 B1 | 6/2001 | Norton | | |
| 8,489,504 B1 | 7/2013 | Gupta | | |
| 8,660,952 B1 * | 2/2014 | Viera | .................. | G06Q 20/108 705/42 |
| 10,108,942 B2 | 10/2018 | Smith et al. | | |
| 10,360,539 B1 | 7/2019 | Sherman et al. | | |

(Continued)

FOREIGN PATENT DOCUMENTS

| | | | |
|---|---|---|---|
| JP | 2004120066 A | * | 4/2004 |
| KR | 20120017986 A | * | 2/2012 |
| WO | 2021038580 | | 3/2021 |

OTHER PUBLICATIONS

Y. Liu, C. Yang and Q. Sun, "Thresholds Based Image Extraction Schemes in Big Data Environment in Intelligent Traffic Management," in IEEE Transactions on Intelligent Transportation Systems, vol. 22, No. 7, pp. 3952-3960, Jul. 2021. (Year: 2021).*

(Continued)

*Primary Examiner* — Virpi H Kanervo
(74) *Attorney, Agent, or Firm* — Rowand LLP; Peter Eschlboeck

(57) ABSTRACT

A computer system is provided, comprising a processor; a communications module coupled to the processor; and a memory module coupled to the processor and storing instructions that, when executed by the processor, cause the computer system to: receive an image representing a check; extract data from a portion of the image; identify routing data, based on the extracted data, from a recipient field associated with the check; and initiate an electronic transfer by sending a transfer message using the routing data. Extracting data from the portion of the image may be performed using image recognition and optical character recognition.

21 Claims, 11 Drawing Sheets

(56) References Cited

U.S. PATENT DOCUMENTS

| | | | |
|---|---|---|---|
| 10,475,129 | B2 | 11/2019 | Cole et al. |
| 10,521,785 | B1* | 12/2019 | Wilson .................. G06Q 20/227 |
| 10,692,066 | B1 | 6/2020 | Brown et al. |
| 10,769,686 | B2 | 9/2020 | Lacerte et al. |
| 10,896,408 | B1 | 1/2021 | Prasad et al. |
| 2002/0083088 | A1 | 6/2002 | Gundy et al. |
| 2002/0152170 | A1 | 10/2002 | Dutta et al. |
| 2008/0086421 | A1* | 4/2008 | Gilder .................. G06Q 20/108 |
| | | | 705/44 |
| 2008/0126145 | A1* | 5/2008 | Rackley, III ......... G06Q 20/102 |
| | | | 455/406 |
| 2008/0249931 | A1* | 10/2008 | Gilder .................. G06Q 20/04 |
| | | | 705/39 |
| 2012/0116972 | A1* | 5/2012 | Walker ............... G06Q 20/0425 |
| | | | 705/44 |
| 2014/0304149 | A1 | 10/2014 | Hockridge et al. |
| 2015/0332229 | A1 | 11/2015 | Rowan |
| 2016/0171481 | A1* | 6/2016 | McElmurry, IV ... G06Q 20/386 |
| | | | 705/39 |
| 2016/0379184 | A1* | 12/2016 | Smith .................. G06Q 10/105 |
| | | | 705/14.23 |
| 2019/0026577 | A1* | 1/2019 | Hall .................... G06V 30/2253 |
| 2019/0026579 | A1* | 1/2019 | Hall .................... G06V 30/2253 |
| 2020/0242570 | A1* | 7/2020 | Benkreira ............ G06Q 20/102 |
| 2021/0035073 | A1* | 2/2021 | Gupta .................. G06Q 20/108 |

OTHER PUBLICATIONS

Sanghita Roy and Dr. Indrajit Sinha. Determinants of Customers' Acceptance of Electronic Payment System in Indian Banking Sector. International Journal of Scientific & Engineering Research, vol. 5, Issue 1, pp. 177-187. Jan. 2014. (Year: 2014).*

Sunil Gupta. The Mobile Banking and Payment Revolution. The European Financial Review. Feb.-Mar. 2013. pp. 3-6. (Year: 2013).*

Benjamin Geva, From Paper to Electronic Order: The Digitalization of the Check in the USA, 4 Penn St. J.L. & Int'i Aff. 96. (Year: 2015).*

K. Thongkor and T. Amornraksa, "An image authentication method for paper checks," 2017 10th International Conference on Ubimedia Computing and Workshops (Ubi-Media), Pattaya, Thailand, 2017, pp. 1-6. (Year: 2017).*

H. Chen, S. S. Tsai, G. Schroth, D. M. Chen, R. Grzeszczuk and B. Girod, "Robust text detection in natural images with edge-enhanced Maximally Stable Extremal Regions," 2011 18th IEEE International Conference on Image Processing, Brussels, Belgium, 2011, pp. 2609-2612. (Year: 2011).*

RSIP Vision Custom Medtech Imaging Algorithms; OCR Check Scanner; Published in RSIP Vision; URL Link: https://www.rsipvision.com/ocr-check-scanner/; retrieved on Jun. 11, 2021.

ExperVision; OCR Software and Solution for Check Processing; Published in ExperVision; URL Link http://www.expervision.com/find-ocr-software-by-document-types/ocr-software-for-check-processing-1; retrieved on Jun. 11, 2021.

* cited by examiner

CHECK-BASED INITIATION OF ELECTRONIC TRANSFERS

TECHNICAL FIELD

The present application relates to the initiation of an electronic transfer using a negotiable instrument, such as a check.

BACKGROUND

The use of checks is less secure and more prone to fraud than other transfer methods, such as electronic transfers. Nevertheless, some customers prefer the use of checks. At times, this preference is due to familiarity and/or habit. This preference may also exist for reasons of bookkeeping. For example, some checks have perforations that allow a check portion to be torn from a receipt or record portion. The receipt or record portion may be filled out with details of the associated check and may be retained in the check book. Some customers, including business customers, may find this convenient since it allows a paper copy of the payment to be retained.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
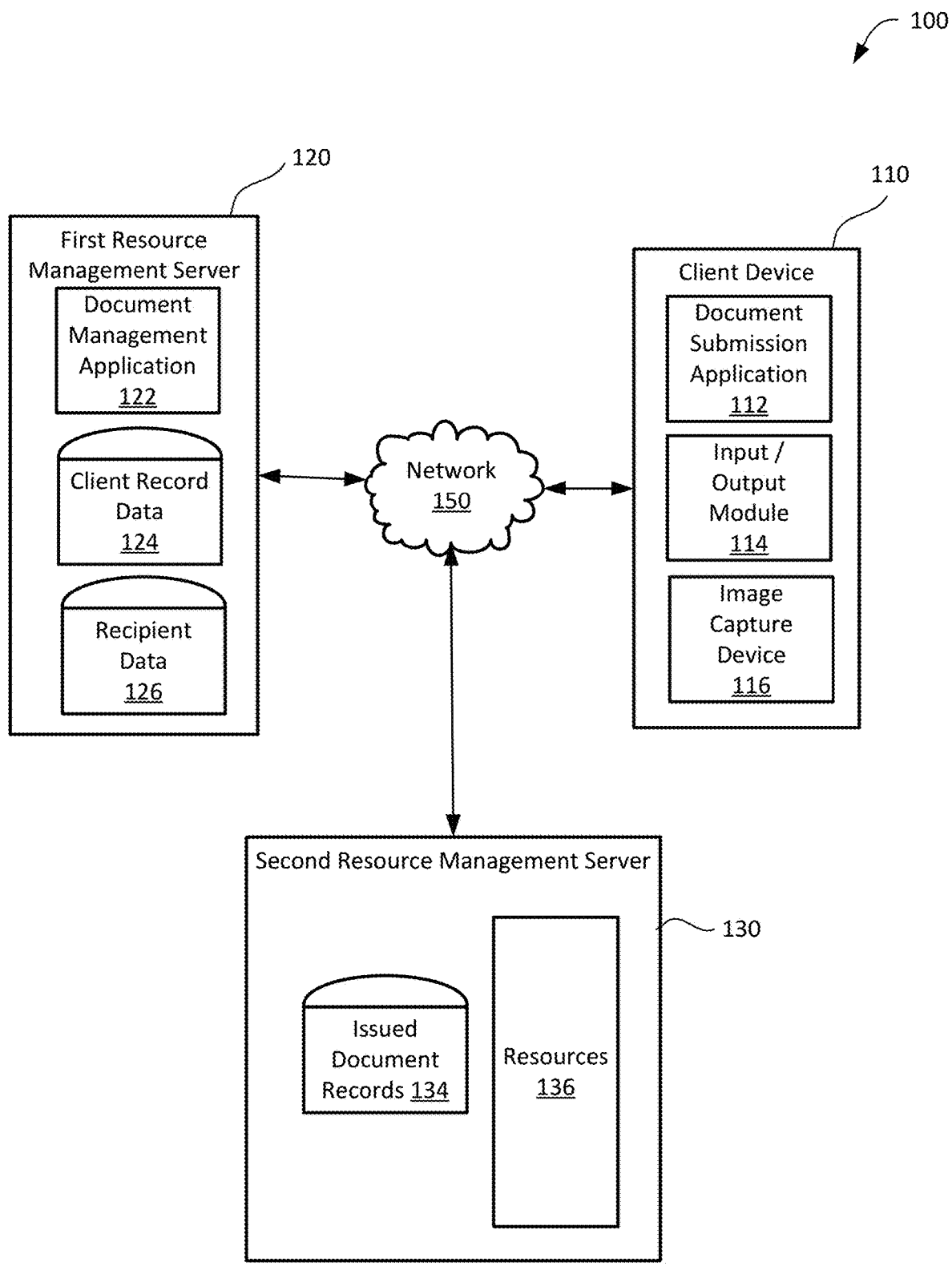
FIG. 1 is block diagram of a system for managing documents associated with resources in accordance with an example of the present application.

According to the subject matter of the present application, there may be provided a computer system. The computer system may include a processor, a communications module coupled to the processor; and a memory module coupled to the processor. The memory module may store instructions that, when executed by the processor, cause the computer system to: receive an image representing a check; extract data from a portion of the image; identify routing data, based on the extracted data, from a recipient field associated with the check; and initiate an electronic transfer by sending a transfer message using the routing data.

In some implementations, the recipient field may define an email address and the electronic transfer may be initiated by sending the transfer message to the email address.

In some implementations, the recipient field may define a phone number and the electronic transfer may be initiated by sending a short messaging service (SMS) transfer message to the phone number.

In some implementations, identifying routing data may include comparing content of the recipient field to a list of supported recipients.

In some implementations, identifying routing data may include comparing content of the recipient field to a list of past recipients of transfers for an account associated with the check.

In some implementations, the extracted data may include a transfer amount and initiating the electronic transfer may include initiating the transfer using the transfer amount. In some implementations, the instructions may further cause the computer system to prompt for input of an amount to be electronically transferred.

In some implementations, the extracted data may include a set of security characters and the electronic transfer may be configured to include the set of security characters.

In some implementations, the instructions may further cause the computer system to identify the set of security characters, based on the extracted data, from a memo line field associated with the check.

In some implementations, the instructions may further cause the computer system to receive confirmation that the transfer has been completed and may generate an electronic receipt indicating that the transfer has been completed. The electronic receipt may resemble the check.

According to the subject matter of the present application, there may be provided a computer-implemented method. The method may include: receiving an image representing a check; extracting data from a portion of the image; identifying routing data, based on the extracted data, from a recipient field associated with the check and initiating an electronic transfer by sending a transfer message using the routing data.

In some implementations, the recipient field may define an email address and the electronic transfer may be initiated by sending the transfer message to the email address.

In some implementations, the recipient field may define a phone number and the electronic transfer may be initiated by sending a short messaging service (SMS) transfer message to the phone number.

In some implementations, identifying routing data may include comparing content of the recipient field to a list of supported recipients.

In some implementations, identifying routing data may include comparing content of the recipient field to a list of past recipients of transfers for an account associated with the check.

In some implementations, the extracted data may include a transfer amount and initiating the electronic transfer may include initiating the transfer using the transfer amount.

In some implementations, the method may further include prompting for input of an amount to be electronically transferred.

In some implementations, the extracted data may include a set of security characters and the electronic transfer may be configured to include the set of security characters.

In some implementations, the method may further include identifying the set of security characters, based on the extracted data, from a memo line field associated with the check.

In some implementations, the method may further include: receiving confirmation that the transfer has been completed; and generating an electronic receipt indicating that the transfer has been completed. The electronic receipt may resemble the check.

According to the subject matter of the present application, there may be provided a non-transitory computer-readable storage medium. The storage medium may store instructions that, when executed by a processor of a computing device, cause the computing device to: receive an image representing a check; extract data from a portion of the image; identify routing data, based on the extracted data, from a recipient field associated with the check; and initiate an electronic transfer by sending a transfer message using the routing data.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Reference is made to FIG. 1, which illustrates, in block diagram form, a system 100 for managing and/or interacting with documents associated with resources in accordance with an example of the present application. Documents may include checks (which may also be referred to as cheques) or other negotiable financial instruments for transferring monetary value from a transferor entity to a recipient entity. It can be understood that documents being managed may be other types of documents, such as vouchers, digital certificates, or the like for transferring any other types of resources such as services, goods, tokens, digital assets, among other examples.

The system 100 may include a client device 110, such as a mobile computing device. The system 100 may also include a first resource management server 120 and a second resource management server 130. The system 100 includes a network 150. The client device 110, the first resource management server 120, and the second resource management server 130 may be configured to communicate with one another or with any other device over the network 150. The network 150 may include one or a combination of interconnected wired and wireless networks, including the internet, local area networks, wireless area networks, or the like. The first resource management server 120 and the second resource management server 130 may be described as database management systems.

In some examples, the first resource management server 120 and the second resource management server 130 may be computing servers for organizations such as banking institutions. The second resource management server 130 may be associated with a banking institution at which the recipient entity has a bank account. The first resource management server 120 may be associated with a banking institution at which the transferor entity has a bank account. In FIG. 1, the first resource management server 120 and the second resource management server 130 are illustrated as separate computing devices. That is, the first resource management server 120 may be implemented apart from the second resource management server 130. However, in some examples, the first resource management server 120 and the second resource management server 130 may be combined into a single computing system or may be within a computing domain executing the operations described herein. That is, the banking institution at which the transferor entity may have a bank account and the banking institution at which the recipient entity may have a bank account may be the same banking institution.

The client device 110 may be associated with a transferor entity. The client device 110 includes one or more processors, memory, and a communications module for providing network communications capabilities with other computing devices. The client device 100 may include an input/output module 114. The client device 110 may also include an image capture device 116 for capturing images of documents. The documents may be associated with resources and the transferor entity may transfer, the documents for transferring of resources to a recipient entity. The transfer may take the form of an electronic deposit. As will be described, in some examples, a client device 110 may electronically deposit a document by capturing an image of a document and transmitting the image of the document to the first resource management server 120.

The transferor entity may have created a hard copy check document. The check document may be associated with monetary value that the transferor entity intends to transfer to the recipient entity. The transferor entity associated with the client device 110 may transmit a soft copy of the check document to the first resource management server 120. For example, the client device 110 may include memory that stores a document submission application 112 having processor readable instructions that, when executed cause the processor to perform operations to capture an image of the check document for electronic deposit at a financial institution, among other example operations described herein. Thus, the transferor entity may transmit the image of the check document to the first resource management server 120 (e.g., being associated with a bank account of the transferor entity). without needing to physically provide the check to a recipient visit a brick-and-mortar banking institution location. In this way, the first resource management server 120 may receive an image representing a check. The document submission application may be, for example, a financial or banking application.

The first resource management server 120 may be a single server, multiple servers, a server farm, or any other such arrangement of computing devices to implement computing server-like functionality. The first resource management server 120 includes one or more processors, memory, and a communication module for providing communications capability with other computing devices. As an illustrating example, the first resource management server 120 may be associated with a banking institution at which the transferor entity has a bank account and at which the transferor entity wishes that a resource be transferred from.

The first resource management server 120 includes client record data 124. The client record data includes data structures having information associated with one of more client devices, where the client devices may be computing devices associated with respective users or transferor entities. In some examples, the client record data 124 includes bank account information associated with transferor entities. The bank account information may include a running balance of monetary value associated with the respective transferor entities. Example bank account information for respective transferor entities can be associated with an entity identifier, such as an account number or a transferor identifier.

The client record data may also include historical data relating to previous transfers initiated by transferor entities. For example, the client record data may include lists of past recipients associated with transferor entities. The lists of past recipients may include date, time, account and routing information associated with previous transfers initiated by transferor entities.

The first resource management server 120 may also include recipient data 126. The recipient data 126 may include data maintained by or available to an organization associated with the first resource management server 120. The recipient data 126 may include data associated with recipient entities or biller entities who have registered as such with the organization associated with the first resource management server 120. The recipient entities may include service providers who regularly receive transfers from multiple transferor entities, such as the transferor entity associated with client device 110. For example, the recipient entities may include telecommunications providers, utility companies, credit card providers, and government revenue agencies. The recipient data 126 may include recipient name data, recipient account data or like data associated with effecting transfers to respective recipient entities.

In FIG. 1, the recipient data 126 is illustrated as provided internally within the first resource management server 120. However, the recipient data 126 may be provided internally within the first resource management server 120 or externally. The recipient data 126 may, for example, be provided remotely from the first resource management server 120. For example, the recipient data 126 may be provided within one or more data centers. The data centers may, for example, store data with bank-grade security.

The first resource management server 120 includes a document management application 122 having processor executable instructions stored in memory that, when executed, cause a processor to conduct operations described herein for managing a subject document associated with a resource. For example, the processor executable instructions may configure the processor to receive, from the client device 110, an image of a subject document, such as a check, and to extract data from a portion of the image. For example, the processor may extract a document identifier from the image of the subject document. The document identifier may be the magnetic ink character recognition (MICR) data from a check document. The processor may further obtain additional information associated with the subject document. For example, the contents of various fields of the document may be obtained using, for example, optical character recognition (OCR) operations. These fields may include the date, the recipient, the amount(s), the recipient, the signature and the memo line.

The second resource management server 130 may be a single server, multiple servers, a server farm, or any other such arrangement of computing devices to implement computing server-like functionality. The second resource management server 130 includes one or more processors, memory, and a communication module for providing communications capability with other computing devices. The second resource management server 130 can be associated, for example, with a banking institution at which the recipient entity has a bank account. second resource management second resource management The second resource management server 130 may track resources 136. Resources can include currency, monetary value, digital assets, tokens, precious metals, among other examples of value. In the present example, the resources 136 illustrated in FIG. 1 can be a data structure for tracking a running balance of money being managed by a banking institution. The second resource management server 130 can also include issued document records 134. The issued document records 134 may include a data structure having information associated with a bank account of a recipient entity. For example, the information associated with a bank account can include data associating one or more resources with a bank account of a transferor entity.

Further, the issued document records 134 can include data indicating previous transfers of resources associated with a particular check document from a bank account of a transferor entity to a bank account of a recipient entity.

Figure 2:
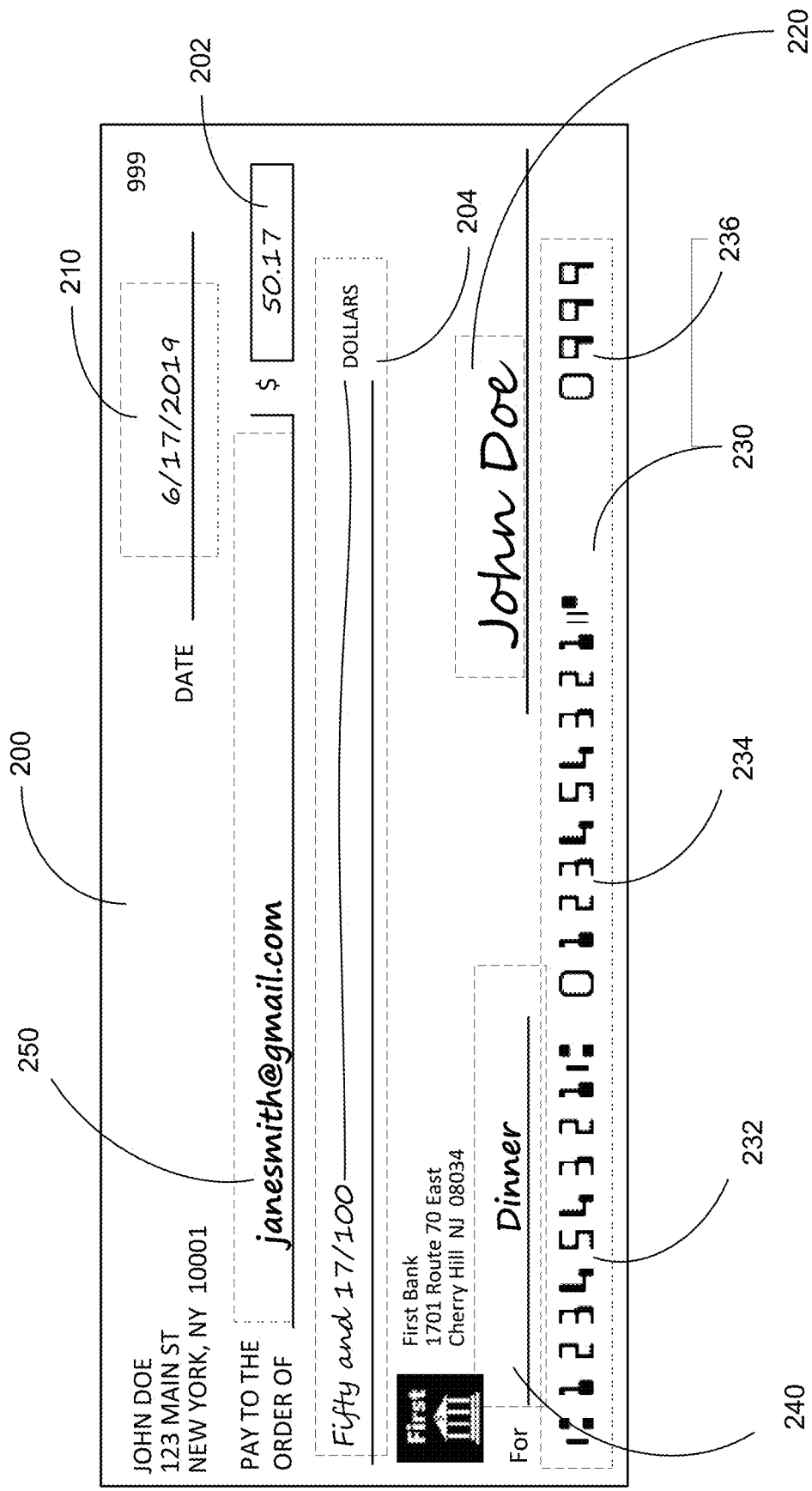
FIG. 2 illustrates an image of an example check, in accordance with an example of the present application.

Reference is now may to FIG. 2, which illustrates an image of an example check 200.

As illustrated, the example check 200 is a check and, in particular, a U.S. check. The example check 200 includes a variety of elements. These elements are standardized according to various standards documents produced by the Accredited Standards Committee X9, Incorporation, and registered with the American National Standards Institute (ANSI) including ASC X9 TR2, "Understanding, Designing and Producing Checks"; ASC X9 TR 6, "Guide to Quality MICR Printing and Evaluation", ASC X9 TR 8, "Check Security"; ASC X9 TR 33, "Check Image Quality Assurance—Standards and Processes"; and ASC X9 TR 100-2013 "Organization of Check-related Payments Standards", the contents of each which is herein incorporated by reference in its entirety. Checks from other jurisdictions may comply with similar standards such as may be promulgated by various national standards organizations and/or industry groups. For example, Canadian checks may include elements standardized according to standards published by Payments Canada (formerly known as the Canadian Payments Association) such as, for example, Standard 006 entitled "Specifications for MICR-Encoded Payment Items", 2017 (available, for example, from the organization's website, www.payments.ca), the contents of which are herein incorporated by reference in their entirety.

As illustrated, the example check 200 includes a variety of elements including a convenience amount field 202, a legal amount field 204, a recipient field 250, a date field 210, a signature field 220, a MICR line 230, and a memo line field 240.

The example check 200 includes two amount fields. The convenience amount field 202 provides an amount of the example check 200 ($50.17) using numerals. The legal amount field 204 provides the amount of the example check 200 using words.

The MICR line 230 provides information about the check 200 in machine-readable format using magnetic ink character recognition (MICR) characters. The characters of the MICR line 230 may be recognized using a magnetic or an optical scanner. The MICR line 230 provides information in a defined format. In particular, the characters of the MICR line 230 are divided into fields, each providing particular information about the check.

The MICR line 230 includes fields including a routing number 232 (found between a pair of "transit symbols") that is followed by an account number 234 (which is terminated by an "on-us" symbol). The routing number provides a nine-digit ABA routing number (ABA RTN). The routing number provides information related to routing of checks in the US Federal Reserve system including allowing the institution on which the check 200 is drawn (the "drawee institution") to be identified. The account number identifies an account at the financial institution corresponding to the routing number. The MICR line may also include a check number 236 indicating which check in a series the account holder has used.

The check also includes other fields such as, for example, a recipient field 250, a memo line field 240 (also known as a "For" line field) as well as the date field 210 and the signature field 220, as mentioned above. These fields provide additional information that may allow the check to be understood or interpreted. For example, the contents of the date field 210 may be considered to determine whether a check is post-dated or stale-dated. In another example, the contents of the signature field 220 may be considered or verified to consider whether the check is valid (e.g. has it been signed by the transferor).

The memo line field 240 is an optional field that has traditionally been used as a space for an unofficial note about the purpose of the check. For example, if the purpose of check 200 was to repay the recipient for a portion of a shared meal, the memo line field 240 may contain the phrase "Dinner". In this way, both the recipient and the payer have a means of identifying the purpose of the check.

The first resource management server 120 may be configured to utilize an image of a check 200 to initiate an electronic transfer. A number of examples of how the image of the check 200 may be used to initiate an electronic transfer will now be described.

In a first example, a customer may use an image of a paper-based check to initiate an electronic transfer. For instance, the customer may fill out a check as they ordinarily would but, rather than providing the physical check directly to the beneficiary, the customer may capture an image representing the check. The image representing the check 200 may be captured, for example, using the image capture device 116 of a client device 110, such as a mobile computing device. The image representing the check 200 may then be provided, via a document submission application 112, to the first resource management server 120 through the network 150.

Figure 3:
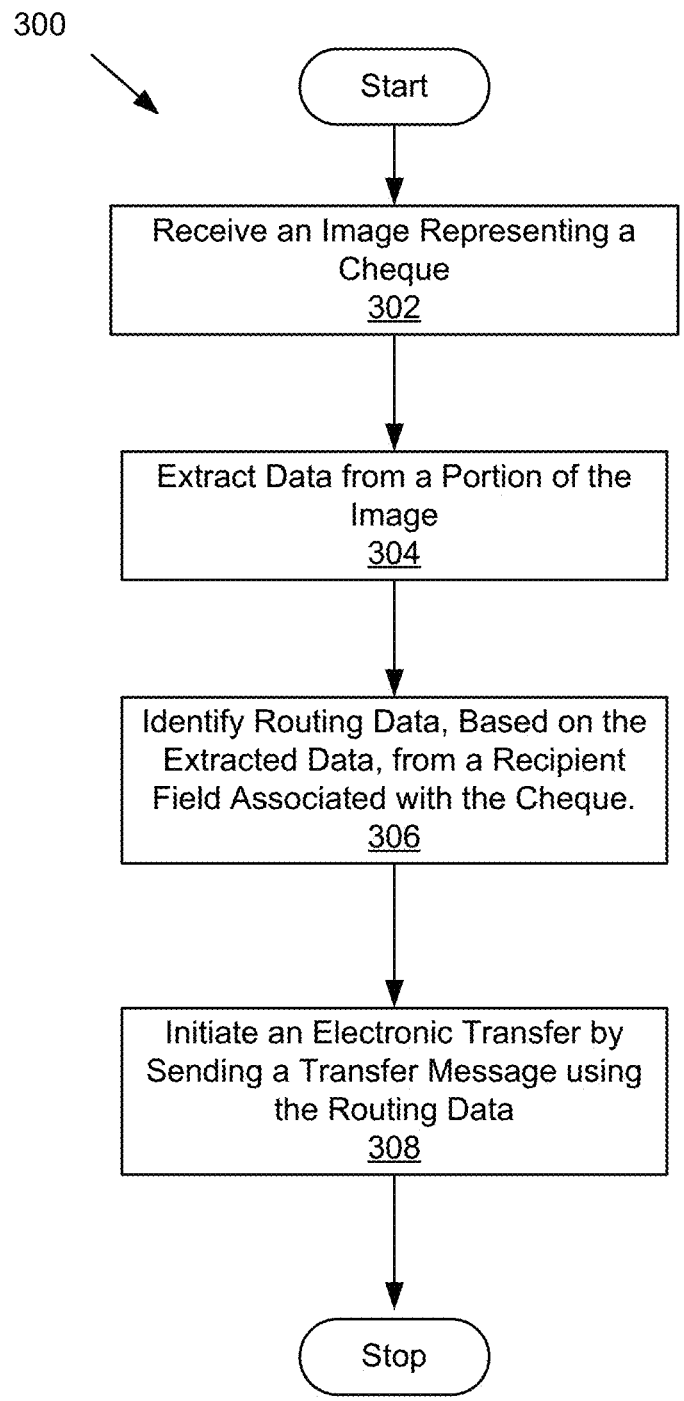
FIG. 3 illustrates a method for providing an initiation of an electronic transfer from an image representing a check, in accordance with an example of the present application.

The operation of the first resource management server 120 will now be described with reference to the flowchart of FIG. 3 which illustrates a method 300 for providing an initiation of an electronic transfer from an image representing a check 200. In performing the method 300, operations starting from an operation 302 and continuing onward are performed by the processor of the first resource management server 120 executing software such as, for example, a suitable instance of the document management application 122.

At the operation 302, an image representing a check 200 is received by the first resource management server 120. As described, the image may be captured using an image capture module of the computing device, such as, for example, a camera. The image representing the check 200 may be captured, for example, using the image capture device 116 of a client device 110, such as a mobile computing device. The captured image may then be transmitted to the first resource management server 120.

Once the image representing the check 200 is received by the first resource management server 120, the first resource management server 120 may, at step 304, extract data from a portion of the image. The portion of the image may include, for example, the MICR line 230, the recipient field 250, the memo line field 240, the date field 210, the legal amount field 204, the convenience amount field 202 and/or the signature field 220. As described, various techniques, including MICR and OCR, may be used by the first resource management server 120 to extract data from the image representing the check.

As described with reference to FIG. 2, the example check 200 includes a variety of elements, and these elements are standardized according to various standards documents across a variety of jurisdictions. As checks may be formatted using an industry-wide standardized template, the data may be extracted using a form of template-based extraction.

The first resource management server 120 may attempt to identify the beneficiary of the check. For example, at step 304, the first resource management server 120 may have applied OCR to the image representing the check to extract the data within the recipient field 250. The first resource management server 120, at step 306, may then attempt to identify routing data, based on the extracted data, from the recipient field 250 associated with the check 200. For example, the first resource management server 120 may access a list of past recipients of transfers for the account associated with the check 200. The list of past recipients of transfers may be accessed, for example, from the client record data 124. The first resource management server 120 may then compare the extracted data from the recipient field 250 to each listed past recipient in order to find a match.

For example, if the account associated with the check 200 indicates that a previous recipient of a transfer was "Jane Smith" and if "Jane Smith" is written in the recipient field 250, the first resource management server 120 may determine that the same Jane Smith to which a transfer was made in the past is the intended recipient of the check 200. At step 308, the first resource management server 120 may initiate an electronic transfer to the identified party using past transfer details (such as a bank account for "Jane Smith" that was used in the past).

In the above example, prior to initiating the electronic transfer, the first resource management server 120 may provide a prompt to the client device 110 for confirmation that the recipient is, indeed, the same party, (i.e. the same "Jane Smith" that transfers have been sent to in the past). Once confirmation is received, the first resource management server 120 may initiate an electronic transfer to the identified party using past transfer details (such as a bank account for "Jane Smith" that was used in the past). The amount of the transfer may be determined using an OCR of the contents of the convenience amount field 202 and the legal amount field 204 provided on the image of the check 200.

The extracted data may include a transfer amount and the first resource management server 120 may initiate the electronic transfer using the transfer amount. For example, the first resource management server 120 may extract data from the legal amount field 204 determine this data to represent the transfer amount. Alternatively, the first resource management server 120 may extract data from the convenience amount field 202 and determine this data to represent the transfer amount. As yet another alternative, the first resource management server 120 may extract data from the legal amount field 204 and the convenience amount field 202 and compare the extracted contents of these two fields. In some instances when the contents of the legal amount field 204 and the contents of the convenience amount field 202 represent the same numerical value, the first resource management server may determine this numerical value to be the transfer amount. The first resource management server 120 may then initiate the electronic transfer using the transfer amount obtained from the extracted data. Prior to initiating the electronic transfer, the first resource management server may send a prompt to the transferor for confirmation of the transfer amount.

Additionally or alternatively, in some instances, prior to initiating the electronic transfer, the first resource management server 120 may prompt for input of an amount to be electronically transferred. The first resource management server 120 may send a prompt to the transferor requesting input of an amount to be electronically transferred. In such instances, the first resource management server 120 may initiate the electronic transfer using the input amount as the transfer amount.

The first resource management server 120 may attempt to identify routing data, based on the extracted data, from the recipient field 250 associated with the check 200 by other means. The routing data may include one or more of an institutional identifier; an account number; a name associated with an account; an email address; an electronic messaging address, such as a short message service (SMS) address and an instant messaging address. For example, the first resource management server 120 may access a list of supported recipients and compare the content of the recipient field 250 to the list of supported recipients. That is, the first resource management server 120 may compare the extracted data from the recipient field 250 to each recipient in a supported recipient list maintained by or available to the first resource management server 120. For example, the first resource management server may compare the extracted data from the recipient field 250 to the recipient data 126. The list of supported recipients may not be customer-specific, but may rather be specific to the system associated with the first resource management server 120. As described, the system associated with the first resource management server may be a financial management system.

As previously described, information, including account information, for many recipients and/or billers such as telecommunications providers, utility companies and government revenue agencies, etc. may be provided in a searchable list of supported recipients available to the first resource management server 120. This list of supported recipients may be used to identify an intended recipient based on the contents of the recipient field 250 field of an image of a check 200. For example, if the contents of a recipient field 250 is "Rogers Communications" and "Rogers Communications" is listed in the searchable list of supported recipients, then the first resource management server 120 may determine that "Rogers Communications" is the intended recipient of the transfer. The first resource management server 120 may send a prompt for confirmation to client device 110 that the identified recipient is the intended recipient and, once confirmation is received, the first resource management server 120 may initiate the transfer.

In some instances, the recipient field 250 may contain an alias of the recipient such as an email address. In some such instances, a type of electronic transfer such as an e-transfer may be used to effect the transfer. The e-transfer may be, for example, an Interac™ e-transfer. In at least some such instances, the recipient field 250 of a check 200 may include an email address, and the first resource management server 120 may extract the email address data from the portion of the image of the check containing the recipient field 250. The first resource management server 120 may then identify routing data based on the extracted email address and may send a transfer message to the email address using the routing data. In some instances, the routing data may be the email address. Prior to sending the transfer message to the email address, the first resource management server 120 may send a prompt to the client device 110 for confirmation of the email address.

As noted, where the recipient field 250 defines an email address, the electronic transfer may be initiated by sending a transfer message to the email address. The transfer message may include information such as the name of the transferor, the amount of the transfer, and a link to deposit the transfer to the account associated with the email address. Subsequent to activating the link to deposit the transfer, and prior to the deposit of the transfer, the recipient may be prompted to provide a security code or phrase. In some instances where a security code or phrase may be required in order to accept an electronic transfer, the security code or phrase may be identified from the contents of the memo line field 240, and the electronic transfer may be configured to include the security code or phrase. For example, with reference to FIG. 2, as the content of memo line field 240 is "Dinner", the security code or phrase, if any, that may be associated with a corresponding electronic transfer would be "Dinner". Prior to initiating the transfer, the first resource management server 120 may send a prompt to the client device 110 for confirmation of the security code or phrase.

In some embodiments, the memo line field 240 may include both a security question and a security code or phrase. For example, with reference to FIG. 2, instead of "Dinner" as the entry in the memo line field 240, the memo line field may include content such as "What is this transfer for? Dinner". In some instances, the presence of a question mark ("?") may serve to define two distinct parts of the memo line field 240. For example, the question mark may serve as a delimiter during the extraction of data from the memo line field 240 by the first resource management server 120. For example, data before the question mark may be interpreted by the first resource management server 120 to represent a first security part and data after the question mark may be interpreted by the first resource management server 120 to represent a second security part. The first security part may represent a security question and the second security part may represent a security code or phrase.

As noted above, subsequent to activating the link to deposit the transfer, and prior to the deposit of the transfer, the recipient may be prompted to provide a security code or phrase. In some instances, the prompt may include a security question. In some instances when the memo line field 250 includes a first security part and a second security part, the prompt may include the first security part. For example, if the memo line field 240 contains the phrase "What is this transfer for? Dinner", the prompt may include the phrase, "What is this transfer for?". In this way, by providing a first security part and a second security part, the memo line field may facilitate the receipt of a transfer by a bonafide recipient.

In some instances, the recipient field 250 may contain an alias of the recipient such as a phone number. In some such instances, a type of electronic transfer, such as an Interac™ e-transfer, may be used to effect the transfer. In at least some such instances, the recipient field 250 of a check 200 may include a phone number, and the first resource management server 120 may extract the phone number data from the portion of the image of the check 200 containing the recipient field 250. The first resource management server 120 may then identify routing data based on the extracted phone number and may initiate an electronic transfer by sending a short messaging service (SMS) message to the phone number using the routing data. Prior to sending the SMS transfer message to the phone number, the first resource management server 120 may send a prompt to the client device 110 for confirmation of the phone number.

As noted, where the recipient field 250 defines a phone number, the electronic transfer may be initiated by sending an SMS transfer message to the phone number. The transfer message may include information such as the name of the transferor, the amount of the transfer, and a link to deposit the transfer to the account associated with the phone number. Subsequent to activating the link to deposit the transfer, and prior to the deposit of the transfer, the recipient may be prompted to provide a security code or phrase.

In some instances, the recipient field 250 may contain an alias of the recipient such as an instant messaging (IM) address. The IM address may be, for example, a WhatsApp™ address, a WeChat™ address or a Viber™ address. In some such instances, a type of electronic transfer, such as an Interac™ e-transfer, may be used to effect the transfer. In at least some such instances, the recipient field 250 of a check 200 may include an IM address such as a phone number, and the first resource management server 120 may extract the identifier data from the portion of the image of the check 200 containing the recipient field 250. The first resource management server 120 may then identify routing data based on the extracted identifier and may initiate an electronic transfer by sending a corresponding IM message to the identifier using the routing data. Prior to sending the IM message, the first resource management server 120 may send a prompt to the client device 110 for confirmation of the identifier.

As noted, where the recipient field 250 defines an IM address, the electronic transfer may be initiated by sending an IM transfer message to the identifier. The transfer message may include information such as the name of the transferor, the amount of the transfer, and a link to deposit the transfer to the account associated with the identifier. Subsequent to activating the link to deposit the transfer, and prior to the deposit of the transfer, the recipient may be prompted to provide a security code or phrase.

In some instances where a security code or phrase may be required in order to accept an electronic transfer, the security code or phrase may be identified from the contents of the memo line field 240, and the electronic transfer may be configured to include the security code or phrase. For example, with reference to FIG. 2, as the content of memo line field 240 is "Dinner", the security code or phrase, if any, that may be associated with a corresponding electronic transfer would be "Dinner". Prior to initiating the transfer, the first resource management server 120 may send a prompt to the client device 110 for confirmation of the security code or phrase. In some instances, the client device 110 may perform the method 300 of FIG. 3. In such instances, the client device 110 may include an application, such as a financial application, configured to perform the steps of method 300. The client device 110 may include contact information, such as an address book, that may facilitate the operation of step 306, (i.e. Identify Routing Data, Based on the Extracted Data, from a Recipient Field Associated with the Cheque). The contact information may provide an association between data extracted from the recipient field 250 and corresponding information such as potential aliases, (e.g. email addresses, phone numbers, IM identifiers), nicknames, routing information, account information, etc. IN some instances, the contact information may provide an identification of routing data associated with the transfer and the client device 110 may execute the steps of the method 300. In some embodiments, however, the client device may identify contact information associated with the contents of the recipient field 250 and provide this information to the first resource management server 120 at step 306. In this way, the client device 110 may provide information to the first resource management server 120 to assist in the identification of the routing information associated with the recipient field 250.

Figure 4:
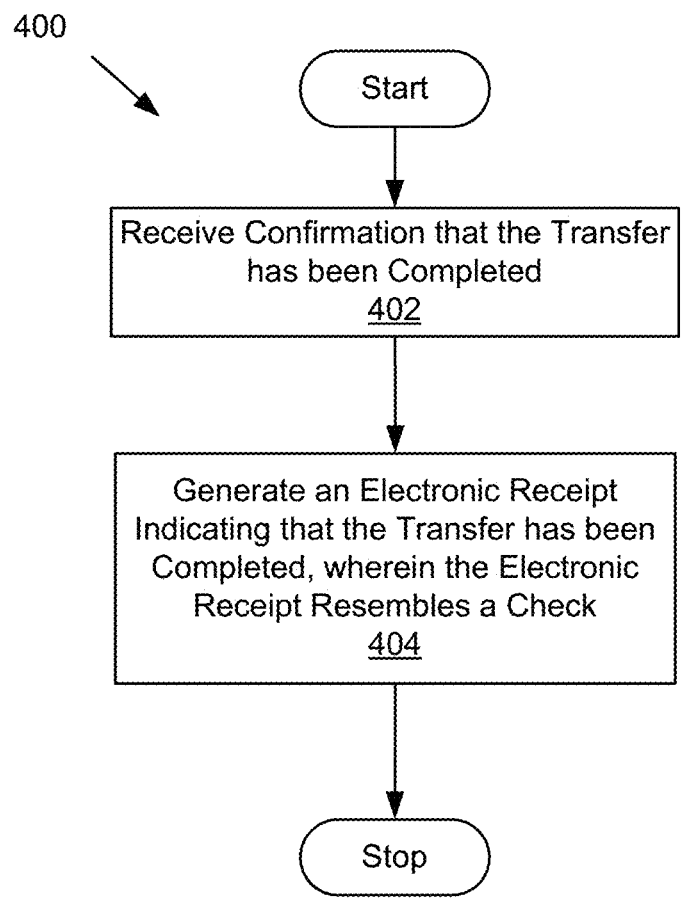
FIG. 4 illustrates a method for generating an electronic receipt indicating that a transfer has been completed, in accordance with an example of the present application.

The operation of the first resource management server 120 will now be described with reference to the flowchart of FIG. 4 which illustrates a method 400 for generating an electronic receipt indicating that a transfer has been completed. The method 400 may be performed after a transfer has been initiated (i.e. after the method 300 of FIG. 3) and executed. The method 400 may also be performed subsequent an electronic transfer that has been initiated by traditional means. The method 400 is not limited to use subsequent a check-based initiation of an electronic transfer.

In performing the method 400, operations starting from an operation 402 and continuing onward may be performed by the processor of the first resource management server 120 executing software such as, for example, a suitable instance of the document management application 122.

At the operation 402, the first resource management server 120 receives confirmation that a transfer has been completed. The confirmation may, for example, be received by monitoring bank account information associated with the client device 110 maintained in the client record data 124. Additionally or alternatively, the confirmation may be received by the second resource management server 130, the first resource management server 120 and/or an intermediary server (e.g. a server associated with the e-transfer, such as Interac™). At operation 404, the first resource management server 120 generates an electronic receipt indicating that the transfer has been completed. The generated electronic receipt may resemble a check. In some instances, the electronic receipt may be formatted such that, when printed, the receipt is of a size and shape suitable for insertion into a check book. Additionally or alternatively, the electronic receipt may be formatted such that, when printed, the printed receipt displays features such as lines indicating where the paper may be cut in order to size the paper for insertion into a check book. Additionally or alternatively, the electronic receipt may be formatted such that it may be printed on specific paper. The specific paper may be designed to be of a size, shape and/or quality such that it may be inserted into a check book.

Figure 5:
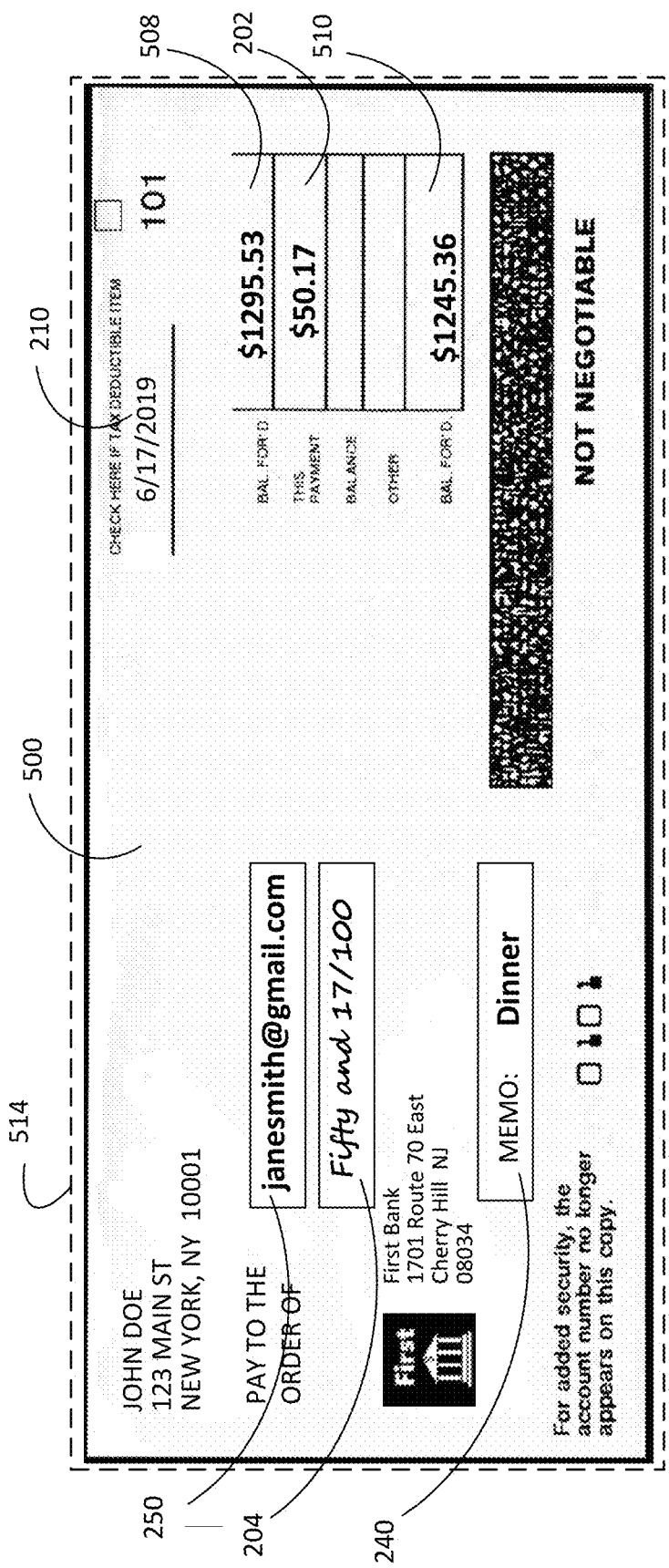
FIG. 5 illustrates an example of an electronic receipt resembling a check, in accordance with an example of the present application.

FIG. 5 illustrates an example of an electronic receipt resembling a check, in accordance with one aspect of the present application. As shown, the electronic receipt resembles the check 200 of FIG. 2, and further resembles a carbon copy of a check of the type associated with a traditional duplicate check book.

A duplicate check book may contain a series of checks, and each check may include a small piece of paper therebehind that serves as a carbon copy of the check. In this way, a carbon copy of each check, or a "duplicate" of each check may be created at the same time for every check written. The creation of carbon copies of original checks may provide a means of record-keeping to the writer of the checks. This means of record-keeping may be desirable to those who choose to avoid internet banking, due to habit, lack of familiarity, etc. A carbon copy of an original check may include the name of recipient, the amount of the check, the date of the check, and memo line field information, if any, and may thus serve as a form of receipt.

Due to the familiarity some users may have with the use of a paper carbon copy of a check as a form of receipt, it may be desirable to generate and provide an electronic receipt that resembles a traditional carbon copy of a check. It may also be desirable to provide the electronic receipt resembling a check in a printer-friendly format so that it may be printed to maintain a check-like record of a transfer. In some instances, the receipt may be printed on paper that is designed to be inserted into a check book. Additionally or alternatively, it may be desirable to generate and provide a receipt with features such as lines indicating where the paper may be cut in order to size the paper for insertion within the check book.

FIG. 5 illustrates an example of a receipt 500 resembling a check in accordance with one aspect of the present application. The receipt 500 may include features associated with the check to which it refers, such as the date field 210, the recipient field 250, the legal amount field 204, the convenience amount field 202 and the memo line field 240. The receipt 500 resembling a check may also include features such as the previous balance 508, (i.e. the amount of resources in the account associated with the check prior to the effect of transfer associated with the check) and the subsequent balance 510, (i.e., the amount of resources in the account associated with the check after the effect of the transfer associated with the check). The receipt resembling a check may include a dashed line 514 to indicate where the paper may be cut in order to size the paper for insertion into a check book.

Figure 6:
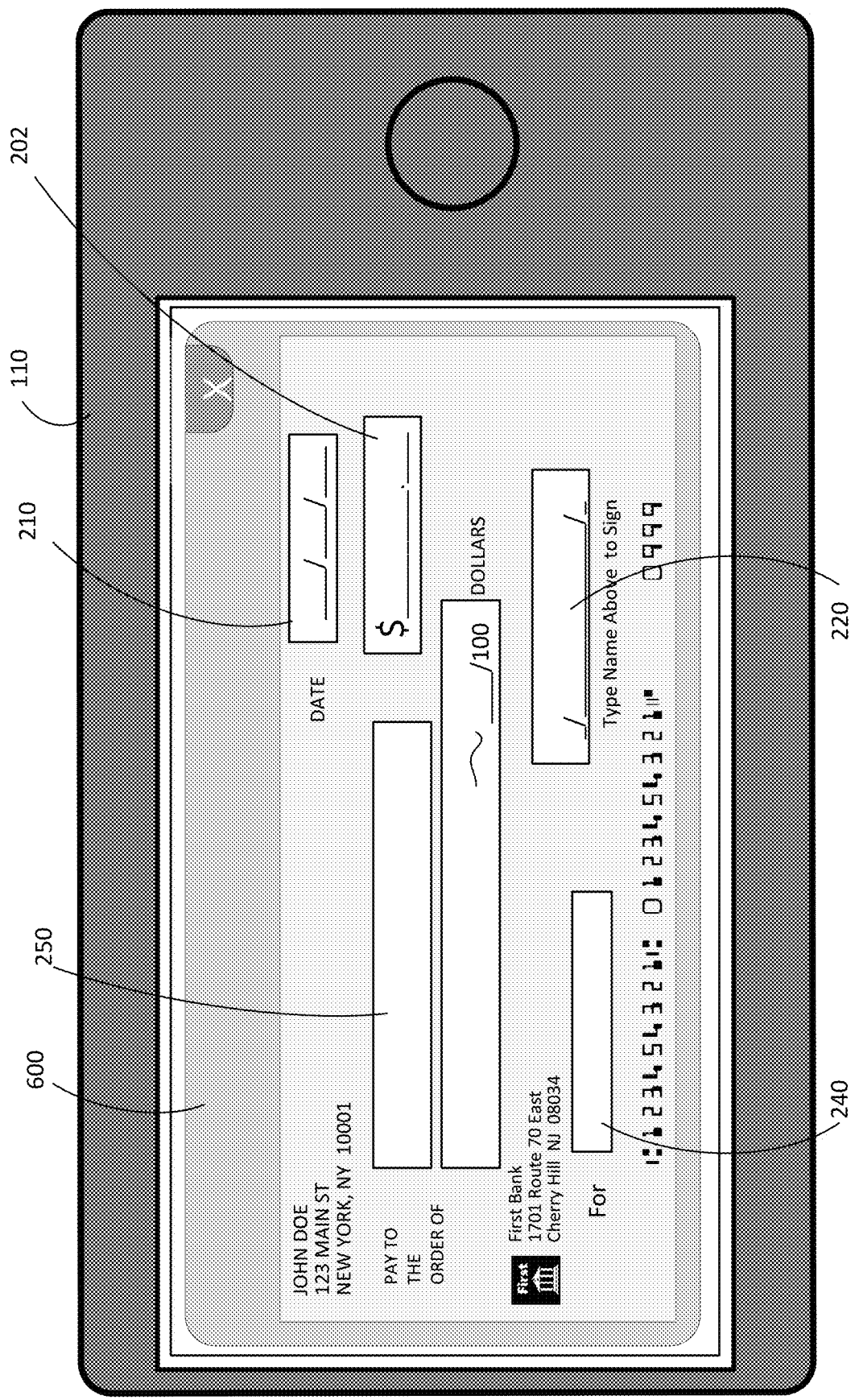
FIG. 6 illustrates an example of a GUI configured to resemble a check, in accordance with an example of the present application.

Other techniques of integrating checks into electronic transfers are provided in accordance with some aspects of the present application. For example, in accordance with one aspect of the present application, there is provided a graphical user interface (GUI) configured to resemble a check for initiating an electronic transfer. FIG. 6 illustrates an example of a GUI configured to resemble a check. As shown in FIG. 6, the GUI may include fields such as those typically included on a check and, in some instances, may require a signature to be input in order for the electronic transfer to be sent. The signature may be input, for example, using input/output device 114.

With reference to FIG. 6, a GUI 600 is shown displayed on client device 110, which, in this example, is a mobile computing device. The GUI 600 includes features such as a date field 210, a recipient field 250, a legal amount field, a convenience amount field 202, an optional memo line field 240 and a signature field 220, such as those typically included on a check. In some instances, the GUI may require a signature to be input in order for the electronic transfer to be sent.

In some instances where the client device 110 is a touchscreen device, the electronic transfer may be initiated as an immediate response to a signature being received. That is, the entry of a signature may be interpreted by the first resource management server 120 as a command to initiate a transfer subsequent to the execution of a signature verification procedure by the first resource management server 120.

In yet another embodiment, a transferor entity may provide a void check to a recipient entity and the recipient entity may scan the void check using a camera to initiate a request for transfer to the recipient entity.

In a first example embodiment, a recipient entity may use an image of a void check 700 to initiate a request for transfer. For instance, a transferor entity may write or stamp "VOID" on a paper-based check and provide the physical check directly to the recipient entity, who may then capture an image representing the void check 700. Alternatively, the transferor entity may write or stamp "VOID" on a check, capture an image representing the void check 700, and electronically transmit the image of the void check 700 to the recipient entity. The image representing the void check 700 may be captured, for example, using the image capture device 116 of a client device 110, such as a mobile computing device.

The image representing the void check 700 may then be provided by the recipient entity to the second resource management server 130.

A request to transfer may be a specially formatted message that is sent from a first database management system, such as the second resource management server 130, to a second database management system, such as the first resource management server 120. The request to transfer may be sent from the second resource management server 130 to the first resource management server 120 over a transfer rail that is used for facilitating transfers between databases associated with different database management systems.

A request to transfer is a message that is sent on behalf of a recipient entity to initiate a transfer from a transferor entity to the recipient entity. That is, the request to transfer is sent, on behalf of the recipient entity, from the second resource management server 130 to the first resource management server 120. The request to transfer requests a transfer from a record in the database that is associated with the transferor entity to a record in the database that is associated with the recipient entity. The request to transfer includes one or more identifiers that identify the record associated with the transferor entity sender and/or the record associated with the recipient entity. The identifier(s) may be or include an account number. The request to transfer may also include one or more identifiers that identify the database management system, such as first resource management server 120, associated with the transferor entity and/or that identify the database management system, such as the second resource management server 130, associated with the recipient entity. Such identifiers may be or include one or more of: a transit number and an institution number.

The request to transfer is a transfer initiation message. That is, the request to transfer is an initial message that may be used to cause a transfer to occur. Since the request to transfer is initiated by a recipient entity rather than a transferor entity, the request to transfer may be considered to a pull-style transfer, which may be contrasted with typical push-style transfers. In at least some implementations, the request to transfer may be formatted as an ISO20022 message.

The request to transfer message is specially formatted to include parameters of a transfer that is requested to be made from a transferor entity. The parameters may be included as metadata in the transfer message. Where the request to transfer is an ISO20022 message, the parameters may be included in an ISO20022 format. The parameters may include resource definition data. The resource definition data defines what is requested to be transferred. By way of example, the resource definition data may define a resource that is stored in or otherwise associated with a record associated with the transferor entity. The resource may be, for example, a computing resource. In another implementation, the resource may be data. In some implementations, the resource may represent an amount of value, such as a quantity of a currency.

The request to transfer message may, in some implementations, be or represent a request for payment. Such a message may be referred to as a request for payment (RFP) message or a request to pay (RTP) message. In such implementations, the transfer rail may be a payment rail such as a real time payment rail and the database management systems may be a financial institution systems. In at least some such implementations, the records may represent bank accounts and a transfer may be a request to transfer value from a transferor entity bank account to the recipient entity bank account. The request to transfer message may be sent from a first financial institution system, which is associated with a first financial institution, to a second financial institution system, which is associated with a second financial institution.

The request to transfer message is a special transfer message which is not formatted as an email or short message service (SMS) message. Rather, it is a computer-to-computer message that is formatted to be specially processed by the database management system that receives it, such as the first resource management server 120. For example, the first resource management server 120 may be configured to execute a process for obtaining authorization to complete a transfer in response to receiving the request to transfer. More particularly, the database management systems, such as the first resource management server 120 and the second resource management server 130 may be configured to only permit authorized transfers. For example, in one implementation, the database stores account data for a plurality of accounts and a database management system will only allow a transfer out of an account if the transfer is authorized by an authorization entity for that account, such as an accountholder. Authorization may, for example, require authenticated approval using a credential such as one or more of a username, password, biometric authentication data or other credential.

In one implementation, in response to receiving the transfer message, a database management system, such as the first resource management server 120, may identify an affected account using an identifier defined by the transfer message. Then, the first resource management server 120 may send an electronic notification to a client device 110 associated with the identified account. This notification may be provided as an in-application notification or operating system level notification. The notification may include a selectable option to authorize the transfer.

The notification may allow the transfer to be made without requiring input of one or more parameters that are typically required when a transfer is initiated by the transferor entity rather than the recipient entity. By way of example, one or more parameters that are included in the request to transfer may be used to pre-stage or pre-populate parameters of the transfer so that the transferor entity does not have to input such parameters. In some implementations, the resource definition data included in the request to transfer may be used to allow the transfer to be made without having the transferor entity define what is to be transferred. For example, where the transfer is a transfer of a computing resource or data, the transferor entity may perform the transfer without having to input any information defining the computing resource or data involved. Or, where the transfer is a transfer of an amount of value, the amount of value defined in the request for transfer message may be used so that the transferor entity does not have to define the amount of value.

In this way, the transferor entity may cause a database management system, such as the first resource management server 120, that is associated with the transferor entity's record in a database to perform the transfer without having to input any parameters for the transfer. The time and/or amount of the transfer may be extracted directly from the request to transfer message. The transferor entity may only need to input an indication of consent to initiate the transfer when the transferor entity has authenticated to the first resource management server 120 and the transfer may then be performed.

Figure 7:
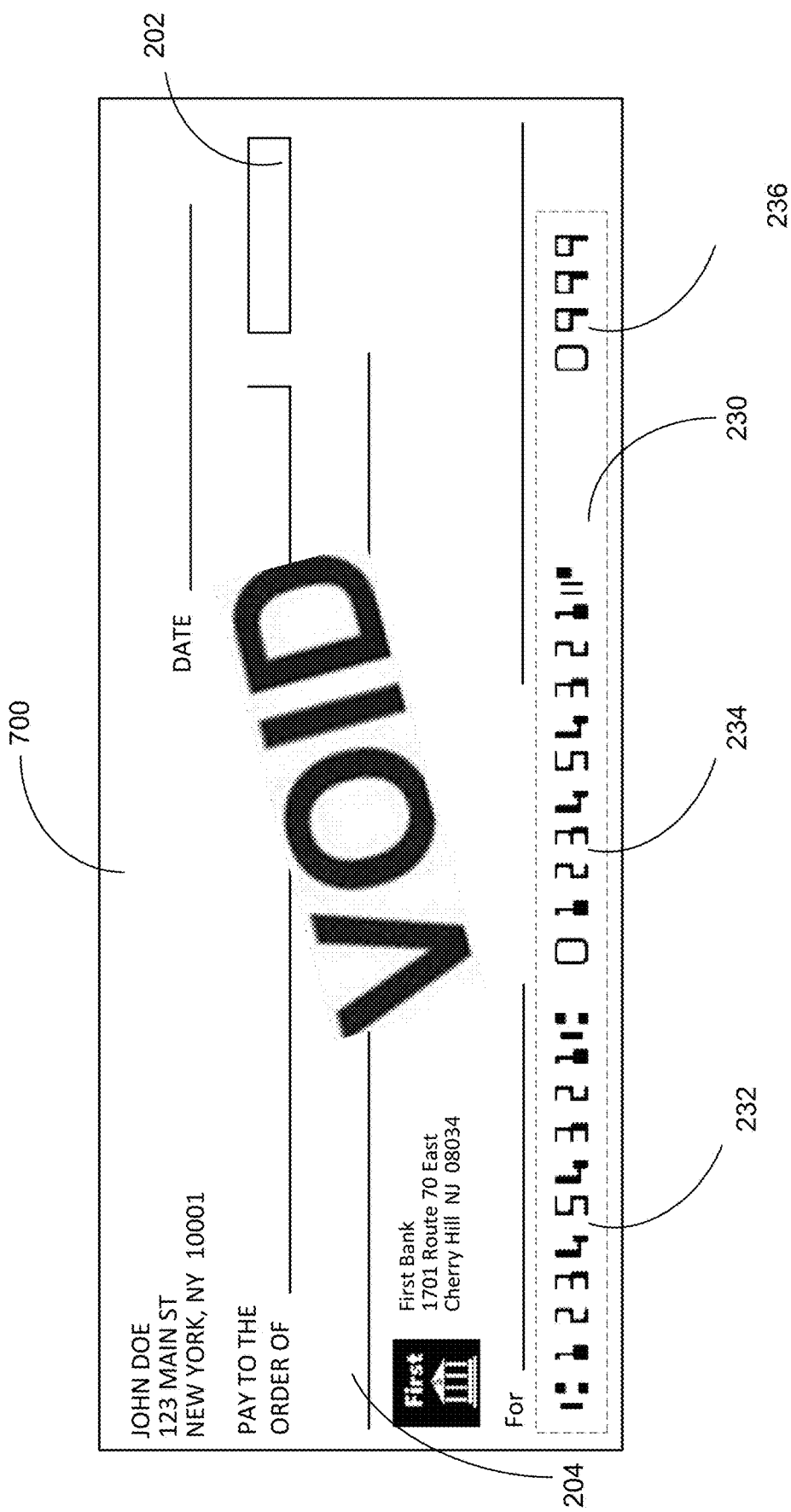
FIG. 7 illustrates an image of a void check, in accordance with an example of the present application.

Reference is now made to FIG. 7, which illustrates an image of a void check 700. As illustrated, the void check 700 includes a variety of elements including a MICR line 230.

The MICR line 230 provides information about the check 200 in machine-readable format using magnetic ink character recognition (MICR) characters. The characters of the MICR line 230 may be recognized using a magnetic or an optical scanner. The MICR line 230 provides information in a defined format. In particular, the characters of the MICR line 230 are divided into fields, each providing particular information about the check.

The MICR line 230 includes fields including a routing number 232 (found between a pair of "transit symbols") that is followed by an account number 234 (which is terminated by an "on-us" symbol). The routing number provides a nine-digit ABA routing number (ABA RTN). The routing number provides information related to routing of checks in the US Federal Reserve system including allowing the institution on which the check 200 is drawn (the "drawee institution") to be identified. The account number identifies an account at the financial institution corresponding to the routing number. The MICR line may also include a check number 236 indicating which check in a series the account holder has used.

Figure 8:
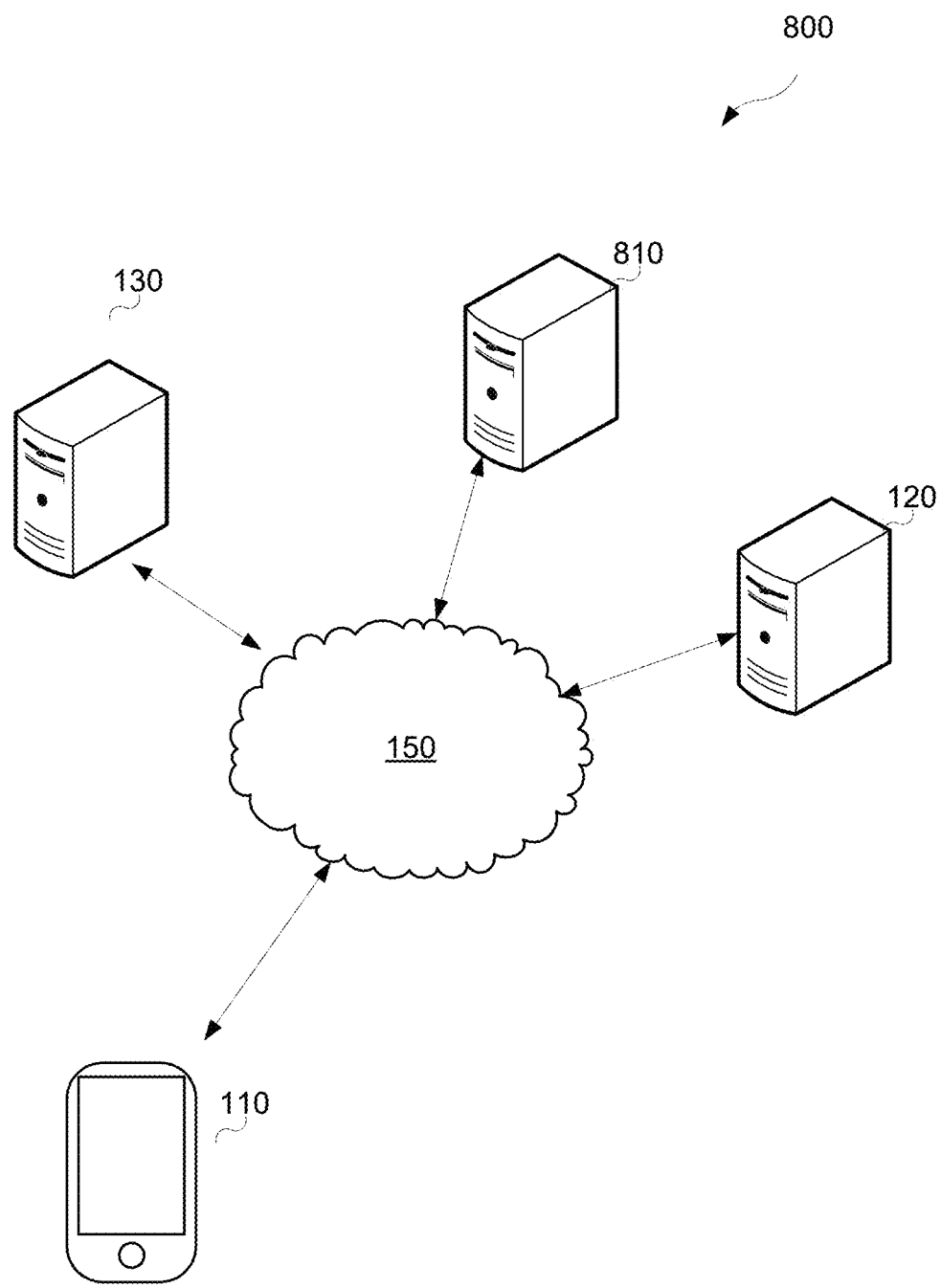
FIG. 8 is a block diagram illustrating an operating environment of an example embodiment, in accordance with an example of the present application.

Reference is now made to FIG. 8, which is a block diagram illustrating an operating environment of an example embodiment. Various components cooperate to provide a system 800 which may be used, for example, to perform an operation. As shown, the system 800 includes the client device 110, the first resource management server 120, the second resource management server 130 coupled to one another through the network 150, which may include a public network such as the Internet and/or a private network In at least some embodiments, a transfer rail server 810 may be configured to facilitate a transfer from a first data record to a second data record according to a first transfer protocol. The first data record may be a data record maintained by the first resource management server 120 and the second data record may be a data record maintained by the second resource management server 130. The transfer rail server 810 may operate as an intermediary between the first resource management server 120 and the second resource management server 130.

One or more of the transfer protocols may not require the use of a transfer rail server. For example, one or more of the transfer protocols may operate through the exchange of messages directly between the first resource management server 120 and the second resource management server 130. Such messages may be exchanged through the network 150.

The client device 110, the first resource management server 120, the second resource management server 130 and the transfer rail server 810 may be in geographically disparate locations. Put differently, the client device 110, the first resource management server 120, the second resource management server 130 and the transfer rail server 810 may be remote from one another.

In some embodiments, the first resource management server 120 may be configured to operate as a first database management system and the, the second resource management server 130 may be configured to operate as a second database management system. A database management system may be configured to send and receive a request to transfer. A request to transfer may be a specially formatted message that is sent from a first database management system, such as a second resource management server 130 to a second database management system, such as a first resource management server 120. The request to transfer may be sent from the second resource management server 130 to the first resource management server 120 over a transfer rail that is used for facilitating transfers between databases associated with different database management systems.

FIG. 8 illustrates an example representation of components of the system 800. The system 800 can, however, be implemented differently than the example of FIG. 8. For example, various components that are illustrated as separate systems in FIG. 8 may be implemented on a common system. By way of further example, the functions of a single component may be divided into multiple components.

Figure 9:
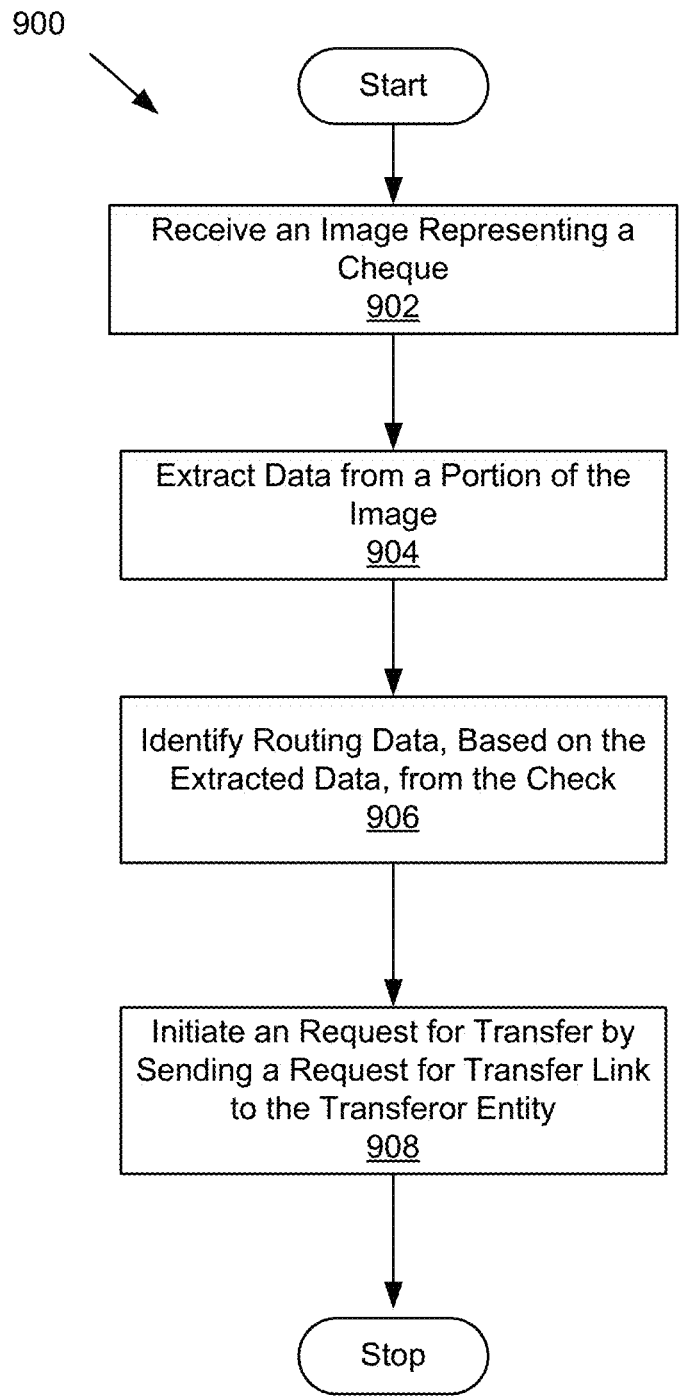
FIG. 9 is a flowchart illustrating a method for initiating a request for transfer to a recipient entity from an image representing a check, in accordance with an example of the present application.

The operation of the second resource management server 130 will now be described with reference to the flowchart of FIG. 9 which illustrates a method 900 for initiating a request for transfer to the recipient entity from an image representing a void check 700. In performing the method 900, operations starting from an operation 902 and continuing onward are performed by the processor of the second resource management server 130. For example, computer-executable instructions stored in memory of the second resource management server 130 may, when executed by one or more processors, configure the second resource management server 130 to perform the method 900 or a portion thereof.

At the operation 902, an image representing a void check 700 is received by the second resource management server. As described, the image may be captured using an image capture module of the computing device, such as, for example, a camera. The image representing the void check 700 may be captured, for example, using the image capture device 116 of a client device 110, such as a mobile computing device.

At operation 904, the second resource management server 130 extracts data from a portion of the image. The portion of the image may include, for example, the MICR line 230, the recipient field 250, the legal amount field 204, the convenience amount field 202 and/or the signature field 220. As described, various techniques, including MICR and OCR, may be used by the second resource management server 130 to extract data from the image representing the check.

The extracted data may include a transfer amount and the first resource management server 120 may initiate the request for transfer using the transfer amount. For example, the first resource management server 120 may extract data from the legal amount field 204 determine that this data to represent the transfer amount. Alternatively, the first resource management server 120 may extract data from the convenience amount field 202 and determine that this data to represent the transfer amount. As yet another alternative, the first resource management server 120 may extract data from the legal amount field 204 and the convenience amount field 202 and compare the extracted contents of these two fields. In some instances when the contents of the legal amount field 204 and the contents of the convenience amount field 202 represent the same numerical value, the first resource management server may determine this numerical value to be the transfer amount. The first resource management server 120 may then initiate the electronic transfer using the transfer amount obtained from the extracted data.

Additionally or alternatively, in some instances, prior to initiating the electronic transfer, the second resource management server 123 may prompt for input of an amount to be included as a parameter in the request for transfer. The second resource management server 130 may send a prompt to the recipient entity requesting input of an amount to be included as a parameter in the request for transfer. In such instances, the second resource management server 130 may initiate the request for transfer electronic transfer using the input amount as the transfer amount.

Where the transfer amount is extracted from the image of the void check, the second resource management server 130 may prompt the user to confirm the transfer amount.

At step 906, the second resource management server 130 Identifies routing data, based on the extracted data, from the void check 700. The routing data may be identified based on the routing number 232 and the account number 234 that may have been extracted from the image of the void check by the second resource management server 130.

At step 908, the second resource management server 130 initiates a request for transfer by sending a request for transfer link to the transferor entity, based on the transfer amount and the routing data. A request for transfer link may be executed, for example, when a user clicks on the link.

Figure 10:
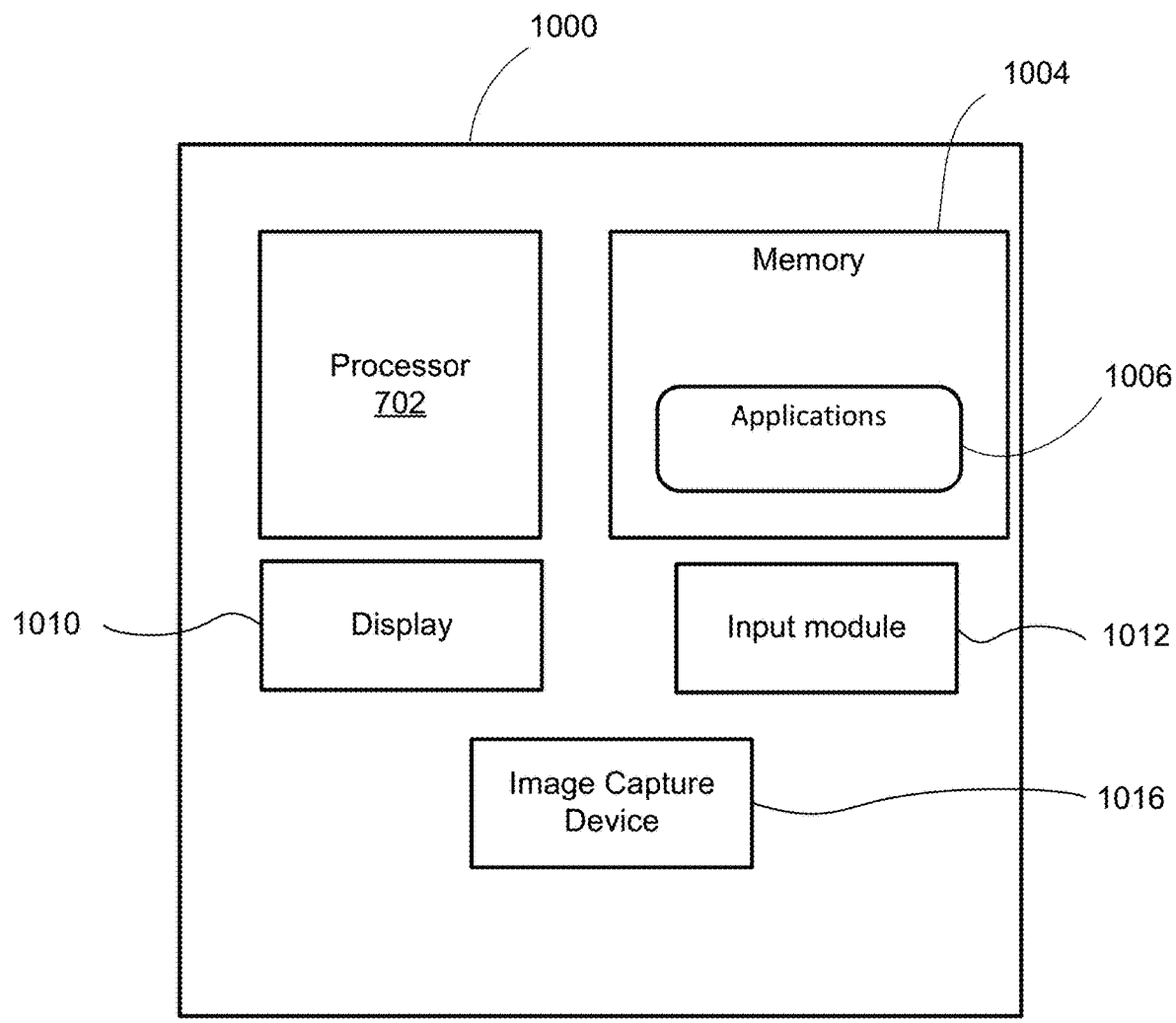
FIG. 10 illustrates, in simplified block diagram form, an electronic device, in accordance with an example of the present application.

Reference is made to FIG. 10, which illustrates, in simplified block diagram form, an electronic device 1000, in accordance with an example of the present application. The electronic device 1000 may be, for example, the client device 110 of FIG. 1. The electronic device 1000 includes one or more processors 1002, memory 1004, and a communications module for providing network capabilities to communicate with other computing devices. The memory 1004 may store processor executable software applications 1006 that include an operating system to provide basic device operations. The software applications 1006 may also include instructions implementing operations of the methods described herein.

The electronic device 1000 includes a display interface and/or a display 1010. The display 1010 may be any suitable display such as a liquid crystal display (LCD), an e-ink/e-paper display, or the like. In some examples, the display 1010 is a touchscreen display. The electronic device 1000 includes an input module 1012 for receiving signals representing commands described in examples herein. In some examples, the electronic device 1000 is a portable electronic device, such as a smartphone, a personal computer, a personal digital assistant, a portable navigation device, a mobile phone, a wearable computing device (e.g., smart watch, wearable activity monitor, or the like), or any other type of computing device that may be configured to store data and software instructions, and execute software instructions to perform example operations described herein. The electronic device 1000 may be associated with one or more users who may interact with the electronic device 1000 using the input module 1012. In some examples, the display 1010 and the input module 1012 may correspond to the input/output module 114 of FIG. 1. The user may operate the electronic device 1000 by way of a provided graphical user interface whereby the electronic device 1000 performs one or more operations consistent with the examples described herein. In some examples, the electronic device 1000 also includes an image capture device 1016. The image capture device 1016 may correspond to the image capture device 116 of FIG. 1 for capturing images of subject documents, as described herein.

Figure 11:
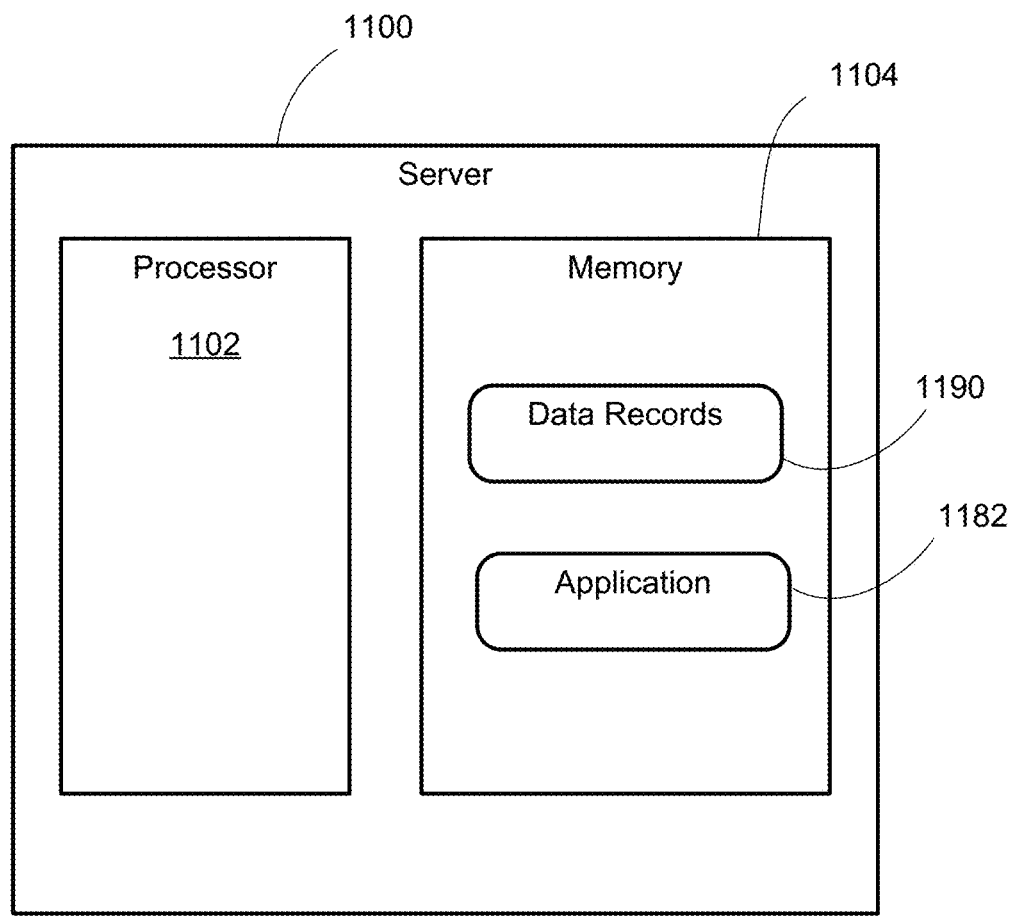
FIG. 11 illustrates, in simplified block diagram form, a server, in accordance with an example of the present application.

Reference is made to FIG. 11, which illustrates, in simplified block diagram form, a server 1100, in accordance with an example of the present application. The server 1100 may be the second resource management server 130 or the first resource management server 120 of FIG. 1. The server 1100 includes one or more processors 1102, memory 1104, and a communications module for providing network capabilities to communicate with other computing devices. The memory 1104 may include data records 1190. In an example of the first resource management server 120, the data records 1190 can include the client record data 124 and/or the recipient data 126. In an example of the second resource management server 130, the data records 890 may be the issued document records 134 of FIG. 1.

The memory 1104 can also include applications 1182 having instructions for performing the operations described herein. In an example of the first resource management server 120, the applications 1182 may include the document management application 122 of FIG. 1.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:

1. A resource management server comprising:
one or more processors;
a communications module coupled to the one or more processors; and
a memory module coupled to the one or more processors and storing instructions that, when executed by the one or more processors, cause the resource management server to:
authenticate, using account information associated with a transferor entity and maintained by the resource management server, a client device associated with the transferor entity;
receive, via the communications module included in the resource management server and from the authenticated client device associated with the transferor entity, an image representing a paper-based check for transferring value from the transferor entity and captured using an image capture device of the client device, the paper-based check including a recipient field defining an email address identifying an intended recipient of the paper-based check and a memo line field defining a set of security characters;
extract, by the resource management server using a document management application applying optical character recognition, data from a portion of the image;
identify the email address and the set of security characters based on the extracted data;
initiate an electronic transfer by using the email address and the communications module included in the resource management server to send a transfer message from the resource management server to the email address; and
complete the electronic transfer using the set of security characters.

2. The resource management server of claim 1, wherein identifying the email address comprises comparing content of the recipient field to a list of supported recipients.

3. The resource management server of claim 1, wherein identifying the email address comprises comparing the extracted content of the recipient field to a list of past recipients of transfers for an account associated with the check.

4. The resource management server of claim 1, wherein the extracted data includes a transfer amount and wherein initiating the electronic transfer includes initiating the electronic transfer using the transfer amount.

5. The resource management server of claim 1, wherein the instructions further cause the resource management server to prompt for an input of an amount to be electronically transferred.

6. The resource management server of claim 1, wherein the extracted data includes the set of security characters, and wherein the electronic transfer is configured to include the set of security characters.

7. The resource management server of claim 1, wherein the instructions, when executed by the one or more processors, further cause the resource management server to:
receive confirmation that the electronic transfer has been completed; and
generate an electronic receipt indicating that the electronic transfer has been completed, wherein the electronic receipt resembles the check.

8. The resource management server of claim 1, wherein the instructions, when executed by the one or more processors, further cause the resource management server to provide, by the resource management server and to the client device associated with the transferor entity, a prompt confirming the extracted email address as identifying the intended recipient of the check, and upon receiving confirmation, initiate the electronic transfer.

9. The resource management server of claim 1, wherein the instructions, when executed by the one or more processors, further cause the resource management server to identify, based on the email address extracted from the image, routing data including an institutional identifier.

10. The resource management server of claim 1, wherein the memo line field in the paper-based check defines a security code or phrase.

11. The resource management server of claim 1, wherein the memo line field in the paper-based check defines a security code or phrase and further defines a security question.

12. The resource management server of claim 1, wherein a plurality of image recognition techniques are used to extract data from the image.

13. A computer-implemented method comprising:
- authenticating, by one or more processors using account information associated with a transferor entity and maintained by a resource management server, a client device associated with the transferor entity;
- receiving, by the one or more processors via a communications module included in the resource management server and from the authenticated client device associated with the transferor entity, an image representing a paper-based check for transferring value from the transferor entity and captured using an image capture device of the client device, the paper-based check including a recipient field defining an email address identifying an intended recipient of the paper-based check and a memo line field defining a set of security characters;
- extracting, by the one or more processors of the resource management server using a document management application applying optical character recognition, data from a portion of the image;
- identifying, by the one or more processors, the email address and the set of security characters based on the extracted data;
- initiating, by the one or more processors, an electronic transfer by using the email address and the communications module included in the resource management server to send a transfer message from the resource management server to the email address; and
- completing, by the one or more processors, the electronic transfer using the set of security characters.

14. The computer-implemented method of claim 13, wherein identifying the email address comprises comparing the extracted content of the recipient field to a list of supported recipients.

15. The computer-implemented method of claim 13, wherein identifying the email address comprises comparing the extracted content of the recipient field to a list of past recipients of transfers for an account associated with the check.

16. The computer-implemented method of claim 13, further comprising:
prompting for an input of an amount to be electronically transferred.

17. The computer-implemented method of claim 13, wherein the extracted data includes the set of security characters, and wherein the electronic transfer is configured to include the set of security characters.

18. The computer-implemented method of claim 13, further comprising:
- receiving confirmation that the electronic transfer has been completed; and
- generating an electronic receipt indicating that the electronic transfer has been completed, wherein the electronic receipt resembles the check.

19. The computer-implemented method of claim 13, further comprising providing, by the resource management server and to the client device associated with the transferor entity, a prompt confirming the extracted email address as identifying the intended recipient of the check, and upon receiving confirmation, initiating the electronic transfer.

20. The computer-implemented method of claim 13, further comprising identifying, based on the email address extracted from the image, routing data including an institutional identifier.

21. A non-transitory computer-readable storage medium storing instructions that, when executed by one or more processors of a resource management server, cause the resource management server to:
- authenticating, using account information associated with a transferor entity and maintained by the resource management server, a client device associated with the transferor entity;
- receive, via a communications module included in the resource management server and from the authenticated client device associated with the transferor entity, an image representing a paper-based check for transferring value from the transferor entity and captured using an image capture device of the client device, the paper-based check including a recipient field defining an email address identifying an intended recipient of the paper-based check and a memo line field defining a set of security characters;
- extract, by the resource management server using a document management application applying optical character recognition, data from a portion of the image;
- identify the email address and the set of security characters based on the extracted data;
- initiate an electronic transfer by using the email address and the communications module included in the resource management server to send a transfer message from the resource management server to the email address; and
- complete the electronic transfer using the set of security characters.

* * * * *